United States Patent
Hemminger et al.

(10) Patent No.: US 10,246,078 B2
(45) Date of Patent: Apr. 2, 2019

(54) TIME-OPTIMIZED PARTICLE FILTER IN HYBRID VEHICLES

(71) Applicants: AUDI AG, Ingolstadt (DE);
Volkswagen AG, Wolfsburg (DE)

(72) Inventors: Herr Sebastian Hemminger,
Oberriexingen (DE); Florian Zink, Bad Rappenau (DE)

(73) Assignees: AUDI AG, Ingolstadt (DE);
Volkswagen AG, Wolfsburg (DE)

( * ) Notice: Subject to any disclaimer, the term of this patent is extended or adjusted under 35 U.S.C. 154(b) by 0 days.

(21) Appl. No.: 15/717,250

(22) Filed: Sep. 27, 2017

(65) Prior Publication Data
US 2018/0086332 A1 Mar. 29, 2018

(30) Foreign Application Priority Data
Sep. 29, 2016 (DE) .................. 10 2016 218 858

(51) Int. Cl.
*B60W 20/16* (2016.01)
*B60W 20/14* (2016.01)
(Continued)

(52) U.S. Cl.
CPC ............ *B60W 20/16* (2016.01); *B60W 20/14* (2016.01); *B60W 30/18127* (2013.01);
(Continued)

(58) Field of Classification Search
CPC .............. B60W 20/16; B60W 20/14; B60W 30/18127; F01N 3/021; F01N 9/002; F02D 41/02; F02D 41/0245; F02D 41/029
(Continued)

(56) References Cited

U.S. PATENT DOCUMENTS 9,797,361 B2 * 10/2017 Shibachi ............. F02N 11/0866
2006/0292405 A1 * 12/2006 Jang .................. H01M 8/04626
429/9
(Continued)

FOREIGN PATENT DOCUMENTS

DE 60218804 T2 12/2007
DE 102008028448 A1 2/2009
(Continued)

OTHER PUBLICATIONS

Examination Report dated Sep. 14, 2017 of corresponding German application No. 102016218858.5; 10 pgs.
(Continued)

*Primary Examiner* — Yazan A Soofi
(74) *Attorney, Agent, or Firm* — Maier & Maier, PLLC

(57) ABSTRACT

A method for regenerating at least one particle filter of a vehicle with an electric drive and an internal combustion engine. The supplying of an energy storage device of the vehicle with electric energy is paused upon reaching a first charging threshold of at least one particle filter, so that the at least one particle filter is charged to a predetermined threshold value. Upon reaching a second charging threshold of the at least one particle filter by the internal combustion engine, an enthalpy that is introduced by the internal combustion engine into the at least one particle filter is increased relative to an enthalpy that is due to the charge that is associated with the operations.

6 Claims, 1 Drawing Sheet

(51) Int. Cl.
*B60W 30/18* (2012.01)
*F01N 3/021* (2006.01)
*F01N 9/00* (2006.01)
*F02D 41/02* (2006.01)
*H02J 7/14* (2006.01)

(52) U.S. Cl.
CPC .............. *F01N 3/021* (2013.01); *F01N 9/002* (2013.01); *F02D 41/029* (2013.01); *H02J 7/1446* (2013.01); *F01N 2590/11* (2013.01); *F02D 2041/026* (2013.01); *F02D 2200/0812* (2013.01); *F02D 2250/24* (2013.01)

(58) Field of Classification Search
USPC .......................................................... 701/22
See application file for complete search history.

(56) References Cited

U.S. PATENT DOCUMENTS

| | | | |
|---|---|---|---|
| 2007/0204594 A1* | 9/2007 | Ishii | B60K 6/48 60/274 |
| 2015/0057857 A1 | 2/2015 | Katsuta | |

FOREIGN PATENT DOCUMENTS

| | | | |
|---|---|---|---|
| DE | 102011014164 A1 | 12/2011 | |
| DE | 102011112343 A1 | 3/2013 | |
| DE | 102013200856 A1 | 8/2013 | |
| DE | 102013114999 A1 | 7/2014 | |
| DE | 102013202142 A1 | 8/2014 | |
| DE | 102014220860 A1 | 4/2016 | |
| EP | 1197642 A2 | 4/2002 | |
| EP | 2504212 B1 | 7/2013 | |
| GB | 2344059 A | 5/2000 | |
| GB | 2451562 A | 2/2009 | |
| WO | 2015/049565 A1 | 4/2015 | |
| WO | 2015159218 A2 | 10/2015 | |
| WO | WO-2015159218 A2 * | 10/2015 | ............. B60K 6/445 |
| WO | 2016070983 A1 | 5/2016 | |

OTHER PUBLICATIONS

European Search Report, dated Dec. 18, 2017, in corresponding European Application No. 17190399.0; 7 pgs.

* cited by examiner

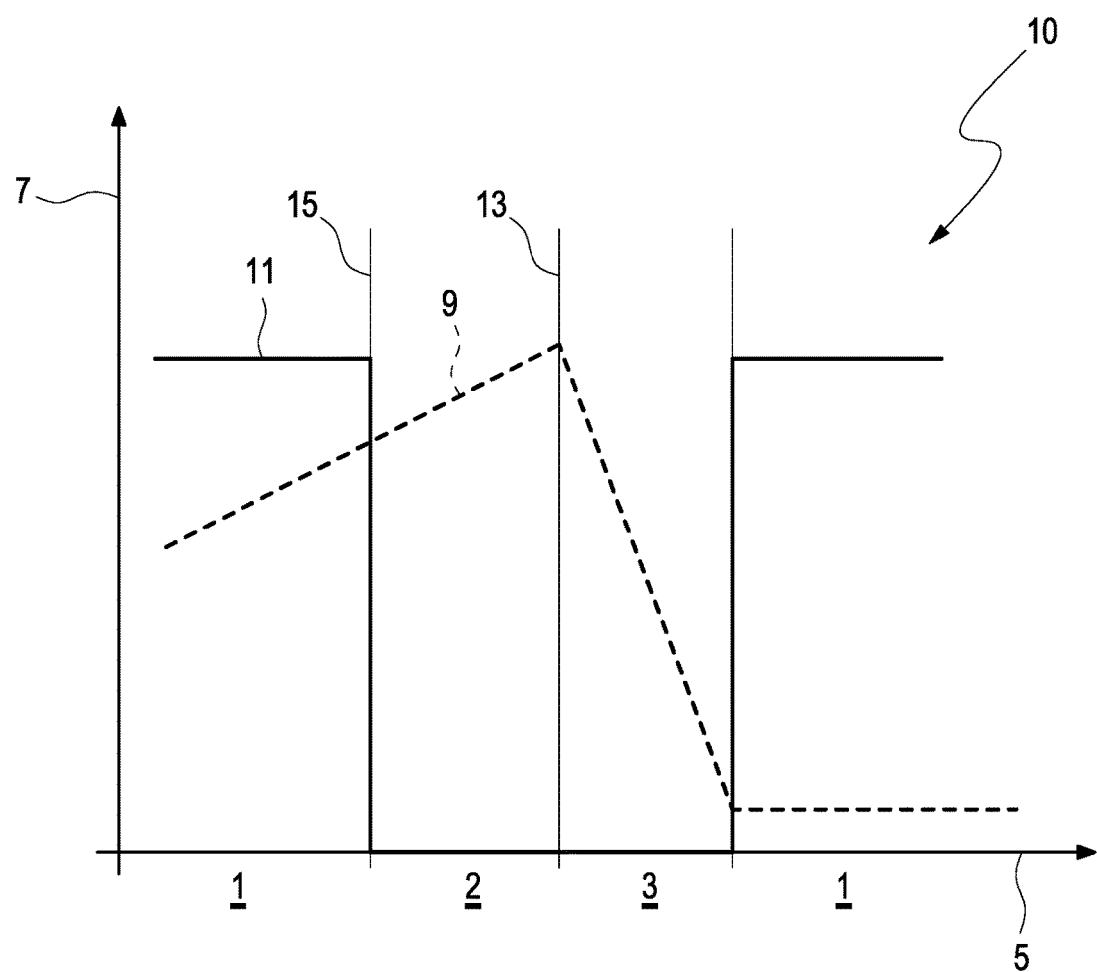

TIME-OPTIMIZED PARTICLE FILTER IN HYBRID VEHICLES

FIELD

The present invention relates to a method for regenerating at least one particle filter of a vehicle that is provided with an electric drive and with an internal combustion engine. The present invention further relates to a motor vehicle.

BACKGROUND

In order to reduce the inconvenience that is caused by fine dust, vehicles are equipped with particle filters, which for example bind soot particles. Because a particle filter is continuously being charged with soot particles, the filter must be regenerated when it has been filled up to a critical threshold. Exhaust gas with a high enthalpy is supplied to the particle filter for the regeneration of an internal combustion engine with a higher enthalpy applied to the particle system, so that the enriched soot is then combusted in the particle filter with the consumption of oxygen and the particle filter can absorb further particles.

German patent DE 10 2013 114 999 A1 discloses a method for regenerating a particle filter of a hybrid vehicle in which a catalytic converter of the vehicle is electrically heated.

A method for regenerating a particle filter by increasing a charge applied to an internal combustion engine is disclosed in German patent DE 10 2008 028 448 A1.

In the European patent EP 25 04 212 B1 is disclosed a method for increasing a charge of a thermal engine by charging an electric storage device.

A method for regenerating a particle filter as a function of an actual geographical position is also disclosed in International Patent Application WO 2016 070 893 A1.

SUMMARY OF THE DISCLOSURE

Against this background, it is an object of the present invention to make it possible to provide regeneration of a particle filter of a vehicle with a hybrid drive as quickly as possible.

In order to achieve the objective mentioned above, a method is proposed for regenerating at least one particle filter of a motor vehicle, wherein electric energy is supplied to an energy storage device of a vehicle so that when a first charging threshold of at least one particle filter is reached, at which the at least one particle filter is charged up to a predetermined threshold value, the supplying is stopped, and when a second charging threshold of at least one particle filter is reached by means of the internal combustion engine, the at least one particle filter is charged in such a way that at least one particle filter must be regenerated, and the enthalpy introduced with the internal combustion engine into the at least one particle filter is increased relative to the load of the enthalpy provided based on the operation, wherein the internal combustion engine is impacted in addition to the charge that is associated with the operations with a charge that is used to generate electric current for the energy storage device.

Embodiments of the present invention will become apparent from the description and from the dependent claims.

The method described here is used in particular to shorten a regeneration phase of a particle filter of a vehicle that is provided with an internal combustion engine and with an electric drive. For this purpose, it is provided according to the invention that the internal combustion engine is impacted with an operational charge, which is to say a charge that is required by a user of the vehicle, namely so that it is impacted with an additional charge in order to increase the enthalpy in one of the exhausts provided by the internal combustion engine. As a result of the increased enthalpy in the exhaust provided by the internal combustion engine, the amount of energy that is introduced with the exhaust into the particle filter with the exhaust is increased, in particular in the amount of the thermal energy, so that the particle filter can be regenerated more quickly than what would be possible by means of the enthalpy that is provided based on the operations.

In order to supply an additional load to the operational load for impacting the respective internal combustion engine, and therefore to increase the enthalpy in an exhaust provided by the internal combustion engine, which is to say to accomplish a shifting of the charge point of the internal combustion engine, according to the invention it is provided that the internal combustion is used for charging the energy storage device of a respective vehicle. This means that a charging assembly can be driven by means of the internal combustion engine, such as for example an electric engine, which can be for example a part of the electric drive provided according to the invention, that is used in order to generate electric energy for charging the energy storage device and to increase the load applied to the internal combustion engine. Based on the additional charge required for driving the electric machine or to move the vehicle, the internal combustion engine combusts more fuel, so that the enthalpy is increased in an exhaust generated by the internal combustion engine relative to the charge that is required for the operation.

With the increase enthalpy in the exhaust of the internal combustion engine, the contribution of energy, or for example of the thermal energy, is increased in a respective particle filter, so that the enriched soot in the particle filter will be combusted faster when compared to a regeneration that is based on an exhaust that is required for the operations, and the particle filter is thus regenerated faster.

Furthermore, in order to impact an internal combustion engine of a respective vehicle with an additional charge relative to the load required for the operations in order to generate electric energy, the energy generated while the internal combustion engine is used must be conducted or transmitted to an energy storage device. In order to store an amount of electric energy generated according to the invention during a regeneration of the particle filter, a sufficient capacity must be provided for a respective energy storage device of the motor vehicle in order to absorb this amount of electric energy. Accordingly, according to the invention it is provided that before the regeneration phase of the particle filter, which is to say when a first charging threshold of the particle filter is reached, which is defined by a predetermined threshold value, supplying of the energy to a storage device, in particular to a drive battery of the motor vehicle, is paused so that the energy storage device can maintain a sufficient capacity in order to absorb the amount of electric energy that was generated during the regeneration phase. In particular, it is provided that the supplying of electric energy to the energy storage device is paused for as long until the regeneration phase of the particle filter is started, so that the supplying of the energy storage device with electric energy is paused or suspended due to a recuperation process for as long until the regeneration phase has ended.

With the pausing provided according to the invention, the supplying of electric energy to a respective energy storage device can result in a temporary reduction of the range that can be reached by the corresponding vehicle. This reduction of the range, however, is at least partially compensated for by the generation of electric energy provided according to the invention by the internal combustion engine during a regeneration phase.

Under a first charging threshold should be in the context of the present invention understood a state of a particle filter during which the particle filter is charged with a predetermined amount of soot, although a sufficient capacity has not been reached yet to perform filtering of the exhaust to be generated by a respective internal combustion engine until a capacity or a charging state of the energy storage device according to the invention is provided that is sufficient for absorbing an amount of electric energy during a regeneration phase of the particle filter while using the internal combustion engine. A charging threshold can be indicated for example by means of a threshold value on a scale ranging from a fully completely uncharged state, which is to say a state that is free of soot, and a fully charged state, which is to say a soot-filled state.

In a possible embodiment of the method it is provided that in order to pause the supplying of the energy storage device with electric energy, a brake system of the vehicle is switched over from a recuperation operation mode to a mechanical operation mode, in which electric energy is not stored in the energy storage device, and after a regeneration of at least one particle filter, the brake system is switched over again from the mechanical operation mode to the recuperation operation mode.

In order to configure a respective energy storage device for the absorption of an amount of electric energy that is generated during a regeneration of a respective particle filter, which is to say during a regeneration phase, in particular to absorb the amount of electric energy that was provided during the regeneration so as to provide a suitable capacity, it is in particular provided that the supplying of a respective energy storage device with electric energy is paused from the moment when the first charging threshold is achieved in at least one particle filter, at least until the start of a respective regeneration phase.

In order to pause supplying of an energy storage device with electric energy, with vehicle having a recuperation-based brake system, it is necessary that the brake system is switched over to and operated in the mechanical operation mode while electric energy is generated during braking and transmitted to the energy storage system, so that the kinetic energy of braking is converted into thermal energy. Accordingly, it is provided that the recuperation-based supplying of electric energy to the energy storage device is paused or suspended until a respective regeneration phase is ended.

In another possible embodiment of the present invention it is provided that upon reaching the first charging threshold of at least one particle filter, the supplying of energy to the energy storage device is paused for as long until a charging state of the energy storage is reached in which the energy storage device is suitable to absorb an amount of electric energy provided during the regeneration of at least one particle filter by means of the internal combustion engine, so that when the internal combustion engine reaches the second charging threshold, it can be impacted with a load corresponding to the amount of electric energy required in order to increase the enthalpy being introduced by means of the internal combustion engine into at least one particle filter.

During the operation of the vehicle it can happen that an energy storage device of the vehicle is fully charged prior to the regeneration of a particle filter, so that a sufficiently high capacity for absorbing the electric energy that is generated according to the method described above cannot be obtained only with a short pause in the supplying of electric energy. In order to nevertheless ensure that a sufficiently high capacity for receiving electric energy will be generated during the regeneration of the particle filter, the supplying of electric energy to the energy storage device is paused for as long until based on an activity of electric consumers, the energy storage device is capable of absorbing an amount of electric energy that will be provided by means of the internal combustion engine during the regeneration of the particle filter. This means that for a time period during which electric energy is supplied to the energy storage device, a capacity is selected in a dynamic manner as a function of an actual charging state of the energy storage device and of the capacity that is required for a regeneration of the particle filter.

In another possible embodiment of the described method it is provided that upon reaching the first charging threshold, at least one electric consumer of the vehicle is activated in order to increase the capacity of the energy storage device.

In order to increase the capacity of the energy storage device provided according to the invention, each technically suitable electric consumer of a respective vehicle, such as for example the cooling system of the internal combustion engine provided according to the invention, can be activated, so that electric energy will be removed from the energy storage device and so that the electric energy that is generated or that is to be generated during the regeneration can be transferred to the energy storage device.

Furthermore, the invention relates to a vehicle with an electric drive, an internal combustion engine, and at least one particle filter and a control device, wherein the control device is configured to pause supplying of an energy storage device of the motor vehicle with electric energy when a first charging threshold of at least one particle filter is reached, at which a particle filter is charged up to a predetermined threshold value, and the internal combustion engine reaches a second charging state of at least one particle filter in which the at least one particle filter is charged in such a way that the at least one particle filter must be regenerated, and wherein the enthalpy introduced by means of the internal combustion engine into the at least one particle filter is increased, namely relative to an enthalpy that is provided with the load impacting the internal combustion engine that is due to the operations, so that an additional charge is impacting the internal combustion engine in addition to the operation-driven charge that is applied to the internal combustion engine, which is used to generate a charging current for the energy storage device.

The above-mentioned vehicle is used in particular to carry out the method described above.

Other advantages and embodiments will become apparent from the description and from the attached FIGURES.

It goes without saying that the features mentioned above and those that are still to be explained can be used not only in the respective indicated combinations, but also in other combinations or in a single setting, without deviating from the scope of the present invention.

BRIEF DESCRIPTION OF THE DRAWINGS

The invention will be next described in detail based on embodiments schematically illustrated in the FIGURE with reference to the schematic illustration.

FIG. 1 shows a schematic overview of the process according to one embodiment of the method according to the invention.

DETAILED DESCRIPTION OF THE DRAWINGS

FIG. 1 shows a diagram 10, which indicates the time on horizontal axis 5, while on the vertical axis 7 is on the one hand shown a recuperation output, and on the other hand also the charging with soot. On the horizontal axis 5 are illustrated different operating phase of a motor vehicle that includes an electric drive and an internal combustion engine, as well as a particle filter for filtering the exhaust that is generated by the internal combustion engine.

The course 9 represents charging of a particle filter with soot, while the course 11 represents a recuperation output of a combustion system of the vehicle. During the described course, the vehicle switches upon reaching a first charging threshold 15 of the particle filter from a normal operation mode 1 to a holdback phase 2. After that, the motor vehicle will switch from the holdback phase 2 upon reaching a second charging threshold 13 to a regeneration operation mode 3 and at the end, as soon as the particle filter is regenerated, it switches back to the normal operation mode 1.

During the normal operation mode 1, the brake system of the vehicle is switched to a recuperation operation mode, wherein electric energy that is generated during braking is transferred to an energy storage device of the vehicle. Accordingly, the recuperation output corresponds to 100%. During the normal operation mode 1, the charging of the particle filter with soot is constantly being increased as indicated by the course 9. The charging state of the particle filter is thus increased in such a manner that the particle filter will after a certain period of time enter into a state in which the first charging threshold 15 is reached and the vehicle is switching to the holdback phase 2, until the charging of the particle filter reaches the second charging threshold 13, and a regeneration, which is to say combustion of the soot particles collected in the particle filter, is required. In order to design the combustion in a timely and efficient manner, according to the invention it is provided to increase the enthalpy of the exhaust generated by the internal combustion engine in such a way that a charge point of the internal combustion engine is raised. The increased enthalpy in the exhaust of the internal combustion engine results in an increased energy input into the particle filter, so that the soot collected in the particle filter is combusted and the particle filter is regenerated.

In order to raise the load point of the internal combustion engine, it is provided that the internal combustion engine is impacted with an additional load that depends on the operating conditions, wherein the internal combustion engine is used for driving a device generating electric energy. The raising of the charge point of the internal combustion engine thus generates electric energy and the enthalpy of the exhaust generated by the internal combustion engine is increased. Due to the increased enthalpy in the exhaust of the internal combustion engine, the energy input is increased in the particle filter by the internal combustion engine, so that the soot charge of the particle filter is reduced to almost zero during the regeneration operation 3.

In order to make it possible to impact the internal combustion engine with an additional charge that is added to the charge which is associated with the operating conditions, it is necessary for the energy storage device of the vehicle to be provided with a sufficient capacity to absorb the electric energy that is generated during the regeneration that is carried out by means of the internal combustion engine. Accordingly, it is provided that before the regeneration is started in a regeneration operation mode 3 and a correspondingly high amount of electric energy is provided, a charging state or a capacity of the energy storage device is adjusted in a holdback phase 2. For this purpose it is provided that transfer of electric energy to the energy storage device is stopped early, already prior to reaching the second charging stage 13. In order to determine the point in time for stopping or pausing the transfer of electric energy to the energy storage device, for example by means of a brake system operating in a recuperation operation mode, a first charging threshold of the particle filter is used, which can be set for example at 95% of the second charging threshold 13.

In the holdback phase 2, the brake system of the vehicle is switched from a recuperation operation mode to a mechanical operation mode, so that the recuperation output of the brake system is lowered to 0%. If the energy storage already has at the beginning of the holdback phase 2 a capacity that is suitable for absorbing the electric energy which is generated during the regeneration, the regeneration operation mode 3 can be started immediately because the recuperation output is at 0% and further charging of the energy storage device should not be expected.

If the capacity of the energy storage device after the switching of the brake system from the recuperation operation mode to the mechanical operation mode is not sufficient in order to absorb the electric energy that will be generated during the regeneration, the vehicle is operated without recuperation for as long as the capacity of the energy storage device is sufficient for absorbing the electric energy that was generated or that will be generated during the regeneration.

As soon as he capacity of the energy storage device is sufficient for absorbing the electric energy that was generated or will be generated during the recuperation so that the internal combustion engine is used for generating exhaust with a higher enthalpy, and the internal combustion engine is impacted with an additional charge that is added to the charge associated with the operations in order to generate electric energy. Because a regeneration cycle always takes place according to a fixed scheme, the capacity that the energy storage device must provided with for the absorption of the electric energy that will be generated or was generated during a regeneration cycle in the regeneration operation mode 3 must be known ahead of time and predetermined accordingly. It goes without saying that the capacity that the energy storage device must provided with for absorbing the energy to be produced or that was produced during the regeneration operation 3 can be also supplied as an estimated value, which includes also a predetermined buffer for a fluctuating amount of electric energy that will be produced or that was produced based on ambient conditions during the regeneration operation 3.

As soon as the regeneration of the particle filter is completed, the regeneration operation mode is ended and the motor vehicle is again switched to the normal operation mode 1, in which the brake system is used again in a recuperation operation mode.

The invention claimed is:

1. A method for regenerating at least one particle filter of a motor vehicle provided with an electric drive and an internal combustion engine, comprising:
    supplying of electric energy to a storage device of the vehicle is paused when at least one particle filter is charged to a predetermined threshold, and wherein upon reaching a second charging threshold of the at least one particle filter, at least one particle filter is charged by the internal combustion engine in such a way that at least one particle filter must be regenerated, an enthalpy initiated by the internal combustion engine in at least one particle filter is increased in comparison to the enthalpy that is associated with operations, wherein the internal combustion engine is impacted in addition to the charge that is associated with operations also with a charge that is used to generate a charging current.

2. The method according to claim 1, wherein for pausing the supplying of the energy storage device with electric energy, a brake system of the energy storage device is switched from a recuperation operation mode to a mechanical operation mode in which electric energy is not stored in the energy storage device, and wherein after a regeneration of the at least one particle filter, the operations of the brake system are switched from the mechanical operation mode to the recuperation operation mode.

3. The method according to claim 1, wherein upon reaching the first charging threshold of the at least one particle filter, the supplying of electric energy is stopped for as long until a charging state of the energy storage device is reached in which the energy storage device is capable of absorbing an amount of electric energy that can be provided by the internal combustion engine during the regeneration of at least on particle filter, so that the internal combustion engine can be impacted upon reaching the second charging threshold with a charge corresponding to an amount of electric energy for increasing the enthalpy to be initiated in at least one particle filter.

4. The method according to claim 1, wherein upon reaching the first charging threshold, at least one electric user is activated in order to increase the capacity of the energy storage device.

5. The method according to claim 1, wherein a drive battery of the motor vehicle is selected as an energy storage device.

6. A vehicle with an electric drive, an internal combustion engine, comprising:
   at least one particle filter and a control device, wherein the control device is configured to pause supplying of electric energy to an energy storage device upon reaching a first charging threshold of at least one particle filter until it is charged to a predetermined threshold value, and wherein the internal combustion engine is charged upon reaching a second charging threshold of the at least one particle filter, so that the at least one particle filter is charged in such way that at least one particle filter must be regenerated, and wherein an enthalpy introduced by the internal combustion engine into the at least one particle filter is increased by impacting the internal combustion engine with a charge in addition to the charge that is associated with the operation of the internal combustion engine, which is used to generate a charging current for the energy storage device.

* * * * *